United States Patent
Scheinert

(10) Patent No.: US 8,229,497 B2
(45) Date of Patent: Jul. 24, 2012

(54) DISTRIBUTED ANTENNA COMMUNICATIONS SYSTEM

(75) Inventor: Stefan Scheinert, San Jose, CA (US)

(73) Assignee: LGC Wireless, LLC, San Jose, CA (US)

( * ) Notice: Subject to any disclaimer, the term of this patent is extended or adjusted under 35 U.S.C. 154(b) by 0 days.

(21) Appl. No.: 13/162,760

(22) Filed: Jun. 17, 2011

(65) Prior Publication Data

US 2011/0244785 A1    Oct. 6, 2011

Related U.S. Application Data

(63) Continuation of application No. 11/823,280, filed on Jun. 26, 2007, now Pat. No. 8,010,116.

(51) Int. Cl.
    *H04M 1/00* (2006.01)
(52) U.S. Cl. ... 455/550.1; 455/13.3; 455/19; 455/277.1; 455/553.1; 370/334; 370/328; 375/267
(58) Field of Classification Search .............. 455/550.1, 455/13.3, 101, 443, 19, 25, 39, 277.1, 553.1, 455/561, 426.1; 370/334, 328, 401; 375/267
    See application file for complete search history.

(56) References Cited

U.S. PATENT DOCUMENTS

| | | |
|---|---|---|
| 3,866,121 A | 2/1975 | Nakamura et al. |
| 4,183,054 A | 1/1980 | Patisaul et al. |
| 4,451,916 A | 5/1984 | Casper et al. |
| 4,611,323 A | 9/1986 | Hessenmuller |
| 4,628,501 A | 12/1986 | Loscoe |
| 4,654,843 A | 3/1987 | Roza et al. |
| 4,667,319 A | 5/1987 | Chum |
| 4,691,292 A | 9/1987 | Rothweiler |
| 4,760,573 A | 7/1988 | Calvignac et al. |
| 4,789,993 A | 12/1988 | Ryu |
| 4,999,831 A | 3/1991 | Grace |

(Continued)

FOREIGN PATENT DOCUMENTS

DE    3707244 A    9/1988

(Continued)

OTHER PUBLICATIONS

Wala, "A New Microcell Architecture Using Digital Optical Transport ", "Proceedings of the Vehicular Technology Conference", May 18, 1993, pp. 585-588, Publisher: IEEE, Published in: US.

(Continued)

*Primary Examiner* — Shaima Q Aminzay
(74) *Attorney, Agent, or Firm* — Fogg & Powers LLC

(57) ABSTRACT

A distributed antenna system comprises a base transceiver station, a plurality of distributed antenna units and a signal routing apparatus. The base transceiver station has a plurality of output ports that generate a plurality of downlink signals having overlapping transmit frequencies and containing different communication content. The different communication content is directed toward each of a plurality of mobile units. The base transceiver station also has at least one uplink receive port that receives an uplink signal. The uplink signal includes communication content received from at least one of the mobile units. The plurality of distributed antenna units have coverage areas that are non-overlapping or only partially overlapping. The signal routing apparatus routes the downlink signals to the plurality of distributed antennas such that each of the plurality of downlink signals are transmitted by one or more of the distributed antennas and each distributed antenna only transmits one of the downlink signals.

20 Claims, 7 Drawing Sheets

U.S. PATENT DOCUMENTS

| | | | |
|---|---|---|---|
| 5,193,109 A | 3/1993 | Chien-Yeh Lee |
| 5,212,831 A | 5/1993 | Chuang et al. |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,351,146 A | 9/1994 | Chan et al. |
| 5,381,459 A | 1/1995 | Lappington |
| 5,400,391 A | 3/1995 | Emura et al. |
| 5,461,627 A | 10/1995 | Rypinski |
| 5,519,691 A | 5/1996 | Darcie et al. |
| 5,563,606 A | 10/1996 | Wang |
| 5,566,168 A | 10/1996 | Dent |
| 5,603,080 A | 2/1997 | Kallander et al. |
| 5,621,786 A | 4/1997 | Fischer et al. |
| 5,627,879 A | 5/1997 | Russell et al. |
| 5,631,916 A | 5/1997 | Georges et al. |
| 5,642,405 A | 6/1997 | Fischer et al. |
| 5,644,622 A | 7/1997 | Russell et al. |
| 5,657,374 A | 8/1997 | Russell et al. |
| 5,668,562 A | 9/1997 | Cutrer et al. |
| 5,682,256 A | 10/1997 | Motley et al. |
| 5,701,583 A | 12/1997 | Harbin et al. |
| 5,708,961 A | 1/1998 | Hylton et al. |
| 5,732,076 A | 3/1998 | Ketseoglou et al. |
| 5,761,619 A | 6/1998 | Danne et al. |
| 5,765,097 A | 6/1998 | Dail |
| 5,765,099 A | 6/1998 | Georges et al. |
| 5,774,789 A | 6/1998 | Van der Kaay et al. |
| 5,781,541 A | 7/1998 | Schneider |
| 5,781,859 A | 7/1998 | Beasley |
| 5,787,344 A | 7/1998 | Scheinert |
| 5,802,173 A | 9/1998 | Hamilton-Piercy et al. |
| 5,805,983 A | 9/1998 | Naidu |
| 5,809,395 A | 9/1998 | Hamilton-Piercy et al. |
| 5,809,419 A | 9/1998 | Schellinger et al. |
| 5,809,422 A | 9/1998 | Raleigh et al. |
| 5,815,538 A | 9/1998 | Grell et al. |
| 5,822,324 A | 10/1998 | Kostresti et al. |
| 5,833,493 A | 11/1998 | Hung |
| 5,852,651 A | 12/1998 | Fischer et al. |
| 5,875,179 A | 2/1999 | Tikalsky |
| 5,878,325 A | 3/1999 | Dail |
| 5,883,882 A | 3/1999 | Schwartz |
| 5,887,261 A | 3/1999 | Csapo et al. |
| 5,907,544 A | 5/1999 | Rypinski |
| 5,912,641 A | 6/1999 | Dietrich |
| 5,930,682 A | 7/1999 | Schwartz et al. |
| 5,946,622 A | 8/1999 | Bojeryd |
| 5,969,837 A | 10/1999 | Farber et al. |
| 5,983,070 A | 11/1999 | Georges et al. |
| 5,987,014 A | 11/1999 | Magill et al. |
| 6,005,884 A | 12/1999 | Cook et al. |
| 6,014,546 A | 1/2000 | Georges et al. |
| 6,034,950 A | 3/2000 | Sauer et al. |
| 6,078,812 A | 6/2000 | Mintz |
| 6,108,113 A | 8/2000 | Fee |
| 6,108,550 A | 8/2000 | Wiorek et al. |
| 6,108,626 A | 8/2000 | Cellario et al. |
| 6,112,086 A | 8/2000 | Wala |
| 6,125,260 A | 9/2000 | Wiedeman et al. |
| 6,128,496 A | 10/2000 | Scheinert |
| 6,147,786 A | 11/2000 | Pan |
| 6,157,659 A | 12/2000 | Bird |
| 6,157,810 A | 12/2000 | Georges et al. |
| 6,181,687 B1 | 1/2001 | Bisdikian |
| 6,188,693 B1 | 2/2001 | Murakami |
| 6,188,719 B1 | 2/2001 | Collomby |
| 6,192,216 B1 | 2/2001 | Sabat, Jr. et al. |
| 6,195,342 B1 | 2/2001 | Rohani |
| 6,198,558 B1 | 3/2001 | Graves et al. |
| 6,222,660 B1 | 4/2001 | Traa |
| 6,226,274 B1 | 5/2001 | Reese et al. |
| 6,236,365 B1 | 5/2001 | LeBlanc et al. |
| 6,249,252 B1 | 6/2001 | Dupray |
| 6,262,981 B1 | 7/2001 | Schmutz |
| 6,275,990 B1 | 8/2001 | Dapper et al. |
| 6,285,881 B1 | 9/2001 | Huang |
| 6,317,884 B1 | 11/2001 | Eames et al. |
| 6,337,754 B1 | 1/2002 | Imajo |
| 6,353,600 B1 | 3/2002 | Schwartz et al. |
| 6,362,908 B1 | 3/2002 | Kimbrough et al. |
| 6,373,887 B1 | 4/2002 | Aiyagari et al. |
| 6,374,124 B1 | 4/2002 | Slabinski |
| 6,377,640 B2 | 4/2002 | Trans |
| 6,421,009 B2 | 7/2002 | Suprunov |
| RE37,820 E | 8/2002 | Scheinert |
| 6,459,900 B1 | 10/2002 | Scheinert |
| 6,466,572 B1 | 10/2002 | Ethridge et al. |
| 6,480,551 B1 | 11/2002 | Ohishi et al. |
| 6,484,012 B1 | 11/2002 | Nche et al. |
| 6,486,907 B1 | 11/2002 | Farber et al. |
| 6,498,936 B1 | 12/2002 | Raith |
| 6,556,551 B1 | 4/2003 | Schwartz |
| 6,567,473 B1 | 5/2003 | Tzannes |
| 6,574,472 B1 | 6/2003 | Scheinert |
| 6,594,496 B2 | 7/2003 | Schwartz |
| 6,667,973 B1 | 12/2003 | Gorshe et al. |
| 6,674,966 B1 | 1/2004 | Koonen |
| 6,684,058 B1 | 1/2004 | Karacaoglu et al. |
| 6,697,603 B1 | 2/2004 | Lovinggood et al. |
| 6,704,545 B1 | 3/2004 | Wala |
| 6,729,929 B1 | 5/2004 | Sayers et al. |
| 6,768,745 B1 | 7/2004 | Gorshe et al. |
| 6,771,933 B1 | 8/2004 | Eng et al. |
| 6,785,558 B1 | 8/2004 | Stratford et al. |
| 6,801,767 B1 | 10/2004 | Schwartz |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,907,048 B1 | 6/2005 | Treadaway et al. |
| 6,917,614 B1 | 7/2005 | Laubach et al. |
| 6,952,181 B2 | 10/2005 | Karr et al. |
| 6,963,305 B2 | 11/2005 | Knapp |
| 6,967,966 B1 | 11/2005 | Donohue |
| 7,014,500 B2 | 3/2006 | Belesimo |
| 7,016,308 B1 | 3/2006 | Gallagher |
| 7,035,671 B2 | 4/2006 | Solum |
| 7,050,786 B2 | 5/2006 | Caci |
| 7,103,279 B1 | 9/2006 | Koh et al. |
| 7,127,175 B2 | 10/2006 | Mani et al. |
| 7,136,624 B2 | 11/2006 | Ofuji et al. |
| 7,151,940 B2 | 12/2006 | Diao et al. |
| 7,205,864 B2 | 4/2007 | Schultz, Jr. et al. |
| 7,215,651 B2 | 5/2007 | Millar |
| 7,289,972 B2 | 10/2007 | Rieser et al. |
| 7,313,415 B2 | 12/2007 | Wake et al. |
| 2002/0037054 A1 | 3/2002 | Schurig |
| 2002/0049061 A1 | 4/2002 | Pinola |
| 2002/0072329 A1 | 6/2002 | Bandeira et al. |
| 2002/0128009 A1 | 9/2002 | Boch et al. |
| 2002/0167954 A1 | 11/2002 | Highsmith et al. |
| 2002/0191565 A1 | 12/2002 | Mani et al. |
| 2003/0015943 A1 | 1/2003 | Kim et al. |
| 2003/0040335 A1 | 2/2003 | McIntosh et al. |
| 2003/0043928 A1 | 3/2003 | Ling et al. |
| 2003/0143947 A1 | 7/2003 | Lyu |
| 2003/0162498 A1 | 8/2003 | Rofheart et al. |
| 2003/0216121 A1 | 11/2003 | Yarkosky |
| 2004/0001477 A1 | 1/2004 | D'Amico et al. |
| 2004/0003804 A1 | 1/2004 | Yasui |
| 2004/0010609 A1 | 1/2004 | Vilander et al. |
| 2004/0037565 A1 | 2/2004 | Young et al. |
| 2004/0066326 A1 | 4/2004 | Knapp |
| 2004/0198453 A1 | 10/2004 | Cutrer et al. |
| 2004/0204097 A1 | 10/2004 | Scheinert et al. |
| 2004/0219950 A1 | 11/2004 | Pallonen et al. |
| 2004/0233877 A1 | 11/2004 | Lee et al. |
| 2004/0248580 A1 | 12/2004 | Backes et al. |
| 2004/0258100 A1 | 12/2004 | Jantti et al. |
| 2005/0007993 A1 | 1/2005 | Chambers et al. |
| 2005/0143091 A1 | 6/2005 | Shapira et al. |
| 2005/0147067 A1 | 7/2005 | Mani et al. |
| 2005/0148368 A1 | 7/2005 | Scheinert et al. |
| 2005/0153712 A1 | 7/2005 | Osaka |

| | | |
|---|---|---|
| 2005/0157675 A1 | 7/2005 | Feder et al. |
| 2005/0176368 A1 | 8/2005 | Young et al. |
| 2005/0201323 A1 | 9/2005 | Mani et al. |
| 2005/0227710 A1 | 10/2005 | Yamashita |
| 2005/0233710 A1 | 10/2005 | Lakkis et al. |
| 2005/0243785 A1 | 11/2005 | Sabat, Jr. et al. |
| 2005/0250503 A1 | 11/2005 | Cutrer |
| 2006/0023803 A1* | 2/2006 | Perlman et al. ............... 375/267 |
| 2006/0025158 A1 | 2/2006 | Leblanc |
| 2006/0041680 A1 | 2/2006 | Proctor, Jr. et al. |
| 2006/0072602 A1 | 4/2006 | Achanta |
| 2006/0094470 A1* | 5/2006 | Wake et al. ............... 455/562.1 |
| 2006/0121944 A1 | 6/2006 | Buscaglia et al. |
| 2006/0123053 A1 | 6/2006 | Scannell, Jr. |
| 2006/0133346 A1 | 6/2006 | Chheda et al. |
| 2006/0172710 A1 | 8/2006 | Cahana et al. |
| 2006/0193295 A1 | 8/2006 | White et al. |
| 2006/0234722 A1 | 10/2006 | Hanebeck et al. |
| 2007/0099562 A1 | 5/2007 | Karabinis et al. |
| 2008/0014948 A1 | 1/2008 | Scheinert |
| 2008/0227487 A1 | 9/2008 | Daniels |
| 2008/0232305 A1* | 9/2008 | Oren et al. ............... 370/328 |
| 2009/0061766 A1 | 3/2009 | Ding et al. |

FOREIGN PATENT DOCUMENTS

| | | |
|---|---|---|
| EP | 0391597 | 10/1990 |
| EP | 0664621 | 7/1995 |
| EP | 0876073 | 11/1998 |
| GB | 2253770 | 9/1992 |
| GB | 2289198 | 11/1995 |
| GB | 2315959 | 2/1998 |
| GB | 2320653 | 6/1998 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0174013 | 10/2001 |
| WO | 0174100 | 10/2001 |
| WO | 2004034508 | 4/2004 |

OTHER PUBLICATIONS

Akos et al., "Direct Bandpass Sampling of Multiple Distinct RF Signals", Jul. 1, 1999, pp. 983-988, vol. 47, Publisher: IEEE Transactions on Communications.

"Edge Introduction of High-Speed Data in GSM/GPSR Networks", 2003, pp. 1-16, Publisher: Ericsson AB.

Foxcom Wireless Properietary Information, "Litenna In-Building RF Distribution System", 1998, pp. 1-8.

1998 Foxcom Wireless Proprietary Information, "Application Note "RFiber—RF Fiberoptic Links for Wireless Applications"", 1998, pp. 3-11, Published in: US.

International Searching Authority, "International Search Report", Oct. 4, 2010, Published in: WO.

"Mulitple-Input Multiple-Output Communications", "http://en.wikipedia.org/wiki/Multiple-input_multipleouput_communications", May 17, 2007, Publisher: Wikipedia, Published in: US.

Nakatsugawa et al., "Software Radio Base and Personal Stations for Cellular/PCS Systems", 2000, pp. 617-621, Publisher: IEEE.

"Products: nanGSM Picocell", "http://www.ipaccess.com/nanGSM/nanGSM.htm", Aug. 2, 2007, pp. 1-8, Publisher: ip.access.

B. Schweber, "Maintaining Cellular Connectivity Indoors Demands Sophisticated Design", "EDN Magazine", Dec. 21, 2000, pp. 46-50.

"Tektronix Synchronous Optical Network (SONET)", "http://www.iec.org/online/tutorials/sonet/topic03.html", Aug. 28, 2002, Publisher: International Engineering Consortium.

Georges et al., "U.S. Appl. No. 08/635,368", "Distribution of Radio-Frequency Signals Through Low Bandwidth Infrastructures", filed Apr. 19, 1996, Publisher: Abandoned, Published in: US.

Schwartz, "U.S. Appl. No. 09/560,656", "Adaptive Capacity Management in a Centralized Basestation Architecture", filed Apr. 27, 2000, Publisher: Abandoned, Published in: US.

Wong et al., "U.S. Appl. No. 09/561,372", "A Cellular Communications System With Centralized Capacity Resources Using DWDM Fiber Optic Backbone", filed Apr. 28, 2000, Publisher: Abandoned, Published in: US.

Hewlett-Packard Development Co., L.P., "Voice Over Wireless LAN Solution Brief", "ProCurve Networking by H.P.", 2006, Publisher: Hewlett-Packard Development Co., L.P.

* cited by examiner

DISTRIBUTED ANTENNA COMMUNICATIONS SYSTEM

CROSS REFERENCES TO RELATED APPLICATIONS

This application is a continuation application of U.S. patent application Ser. No. 11/823,280, filed on Jun. 26, 2007, which issued as U.S. Pat. No. 8,010,116, and is titled "DISTRIBUTED ANTENNA COMMUNICATIONS SYSTEM", which is hereby incorporated herein by reference.

FIELD OF THE INVENTION

The present invention relates to wireless communications and, more particularly, to a distributed antenna system for wireless communications.

BACKGROUND OF THE INVENTION

In a conventional wireless cellular telephone network, base transceiver stations (BTS) facilitate communication between mobile units (e.g. cellular telephones) and the telephone network. A typical base station comprises multiple transceiver units and antennas for sending radio signals to the mobile units (downlink) and for receiving radio signals from the mobile units (uplink). The antennas of the base station are positioned outdoors on a cellular tower or on top of a building. Base stations are strategically located so as to maximize communications coverage over large geographical areas. The base stations are communicatively coupled to the telephone network via backhaul connections.

Conventional base stations have employed one transmit output signal and one receive signal for each antenna of the base station. The transmit and receive signals operate at different frequencies which allows for separation of the transmit and receive signals. This allows the transmit and receive signals to be combined by a duplexer so that a single antenna can be used for transmitting and receiving these two signals. So that multiple mobile devices can communicate simultaneously via the antenna, the transmit and receive signals are each divided into plural channels. For example, CDMA (Code-Division, Multiple Access) protocols for cellular communication, such as UMTS (Universal Mobile Telecommunications System), and TDMA (Time-Division, Multiple-Access) protocols for cellular communication, such as GSM (Global System for Mobile Communications), allow several communications channels to be combined into the transmit and receive signals.

In another configuration, a base station employs receive diversity in which two antennas are used for receiving the uplink signal from the mobile units. In this case, the receive antennas are co-located in that they are mounted to the same outdoor structure but spaced slightly apart from each other. The signals from each antenna are then combined to form the uplink signal. This configuration can increase the cell coverage or allow the mobile units to use a lower output power.

Newer generations of base stations support multiple-input, multiple-output (MIMO) configurations. One example is MIMO 2×2, in which the base station uses two transmit antennas for the downlink signal and two receive antennas for the uplink signal. Another example is MIMO 4×4, in which four transmit antennas are employed for the downlink signal and four receive antennas are employed for the uplink signal. In all these MIMO configurations, the antennas are co-located in that they are mounted to the same outdoor structure but spaced slightly apart from each other These MIMO configurations are used to improve the throughput of a base station. This is achieved by the base station combining the multiple signals obtained from the multiple antennas to make the combined signal stronger or to reduce interference.

While these MIMO configurations can improve communications when the mobile devices are located outdoors, signal attenuation caused by building structures (i.e. indoor penetration loss) can still result in communication difficulties for mobile units when located indoors.

In a distributed antenna system (DAS), transmitted power is divided among several antennas in distributed locations so as to provide a large coverage area using less transmitted power than would be required by a single antenna. DAS systems have been used to provide indoor coverage for wireless communications. However, conventional distributed antenna systems leave room for improvement.

What is needed is an improved distributed antenna system for wireless communications.

SUMMARY OF THE INVENTION

The present invention provides a distributed antenna system. In accordance with an embodiment, the system comprises a base transceiver station having a plurality of output ports that generate a plurality of downlink signals having overlapping transmit frequencies and containing different communication content. The different communication content is directed toward each of a plurality of mobile units. The base transceiver station also has at least one uplink receive port that receives an uplink signal. The uplink signal includes communication content received from at least one of the mobile units. The system also comprises a plurality of distributed antenna units having coverage areas that are non-overlapping or only partially overlapping. The system further comprises a signal routing apparatus for routing the downlink signals to the plurality of distributed antennas, such that each of the plurality of downlink signals are transmitted by one or more of the distributed antennas and each distributed antenna only transmits one of the downlink signals.

In accordance with an alternative embodiment, the system comprises a plurality of distributed antenna units and a multi-port hub. The hub comprises a first interface for connection to a base station of a telecommunications system, the first interface comprising a plurality of downlink ports for receiving communications from the base transceiver station and a plurality of uplink ports for sending communications to the base transceiver station. The hub also comprises a second interface having downlink ports for sending communications to each of the plurality of antenna units and the first interface having uplink ports for receiving communications from each of the plurality of antenna units. The hub further comprises a means for reconfiguring the hub among a plurality of predetermined configurations, each configuration routing one or more downlink ports of the first interface to a selected group of the downlink ports of the second interface and routing a selected group of the uplink ports of the second interface to one or more of the uplink ports of the first interface.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
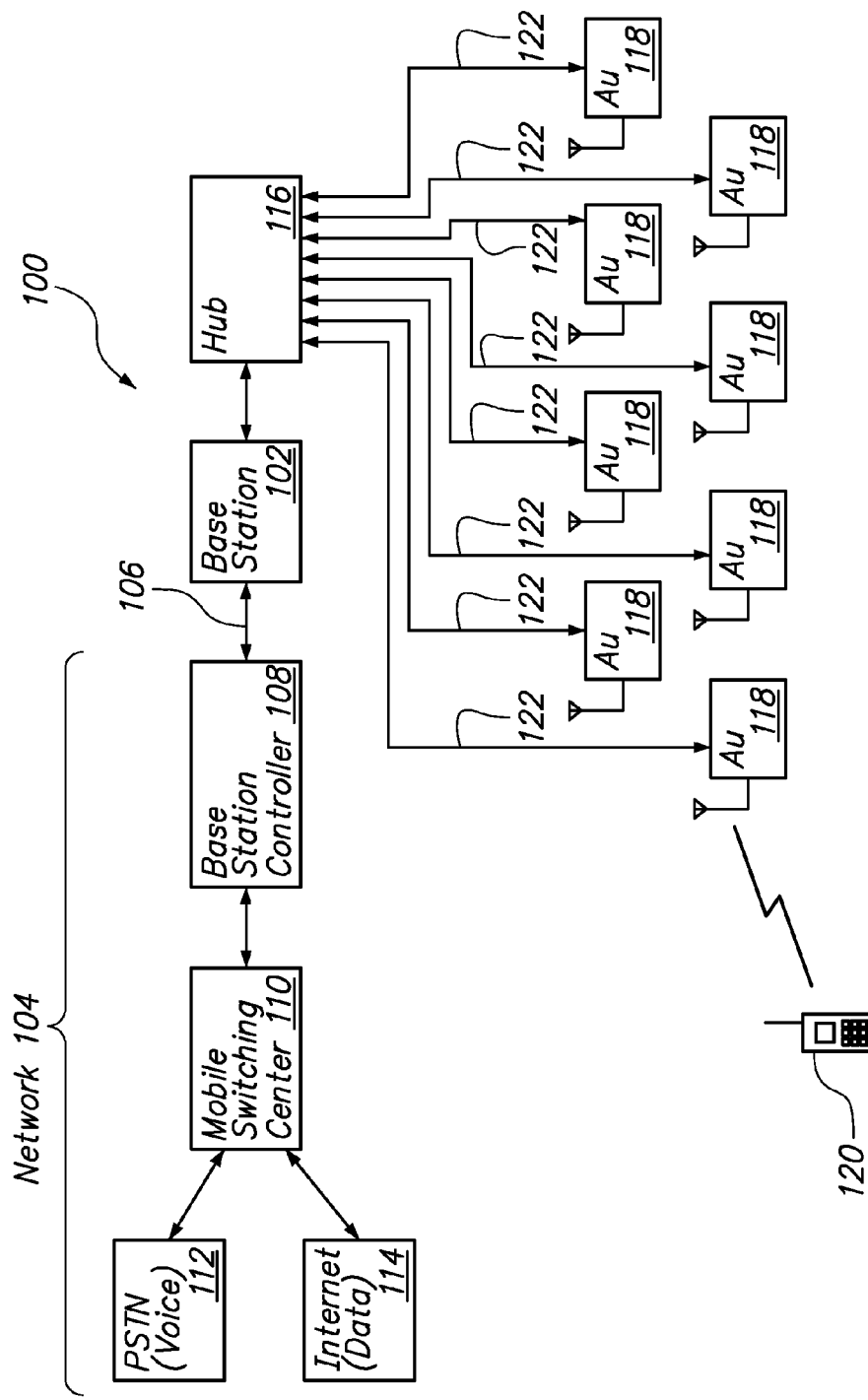
FIG. 1 illustrates a distributed antenna communications system in accordance with an embodiment of the present invention.

FIG. 1 illustrates a distributed antenna communications system 100 in accordance with an embodiment of the present invention. As shown in FIG. 1, a base transceiver subsystem (which may also be referred to as a BTS or base station) 102 is communicatively coupled to a communications network 104 via a backhaul link 106. Within the communications network 104, the backhaul 106 is coupled to a base station controller (BSC) 108, which is, in turn, coupled to a mobile switching center (MSC) 110. The MSC 110 is coupled to a public switched telephone network (PSTN) 112 (e.g. for voice communications) and may also be coupled the Internet 114 (e.g. for data communications).

The BSC 108 may perform various conventional functions including radio channel allocation, call handovers among base stations, configuring the base station 102, handling alarms and performing network management functions. The MSC 110 may perform various conventional functions including circuit switching, and providing applications and call features to mobile subscribers, such as call ringing and roaming. In an embodiment, certain of the features conventionally performed by the BSC 108 and MSC 110 may instead be performed by the base station 102. For example, the base station 102 may include a local server which is configured with a Linux operating system to perform these functions.

The base station 102 is also communicatively coupled to multi-port hub 116 by, for example, a wireless link. The base station 102 may be located at the site of a cellular service provider. The hub 116 is communicatively coupled to a plurality of antenna units 118. Each of the antenna units 118 forms a corresponding coverage area. Typically, the hub 116 and antenna units 118 are located indoors. For example, the hub 116 may be located in a utility closet of commercial building, while the antenna units 118 may be distributed throughout the building so as to form coverage areas that substantially include the occupied areas within the building. The coverage areas of the antenna units 118 are therefore distributed, meaning that they are non-overlapping or only partially overlapping. The antenna units 118 are coupled to the hub 116 by bi-directional links 122. Each antenna unit 118 may include an antenna and a transceiver.

Mobile communications equipment 120 (e.g., a cellular telephone) within a coverage area is communicatively coupled to the communications network 104 via one or more of the antenna units 118, the hub 116, the base station 102 and the backhaul 106. Together, the hub 116 and antenna units 118 form a distributed antenna system (DAS). In the exemplary system shown in FIG. 1, eight antenna units 118 are provided, though it will be apparent that a different number of antenna units 118 may be provided.

The base station 102 may have multiple-input, multiple-output (MIMO) capability. This means that the base station 102 may have capability to process and send parallel downlink signals (i.e. having the same transmit frequency or at least overlapping transmit frequency bands or channels) to multiple transmitting antennas. In addition, the base station 102 may have capability to receive a parallel uplink signals from multiple receiving antennas and to process the signals from each antenna into a combined signal. In this case, the signals from each antenna are at the same receive frequency or at least in overlapping frequency bands and may contain redundant content and/or overlapping channels.

Figure 2:
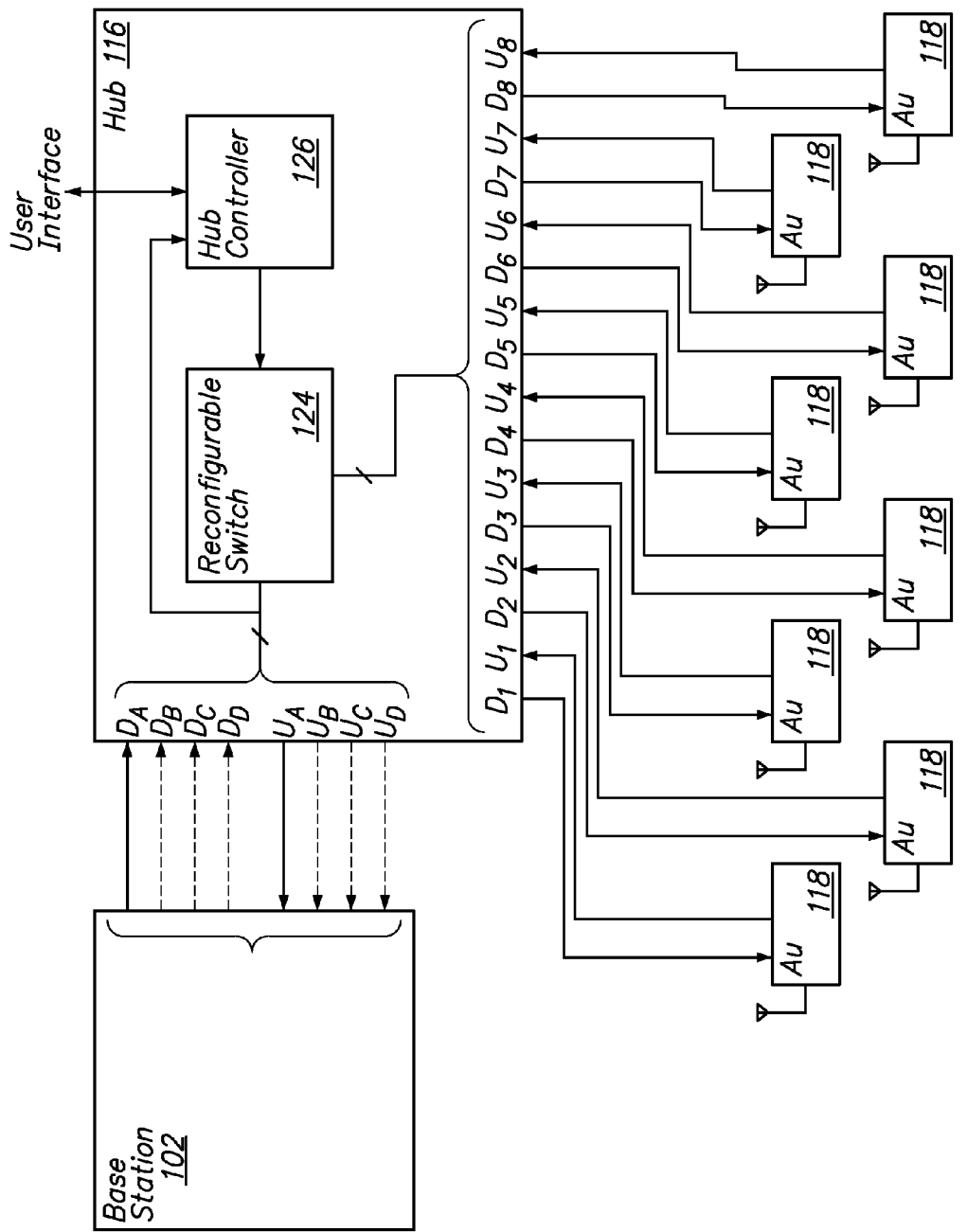
FIG. 2 illustrates details of the multi-port hub of FIG. 1 in accordance with an embodiment of the present invention.

FIG. 2 illustrates details of the multi-port hub of FIG. 1 in accordance with an embodiment of the present invention. The base station 102 is connected to one or more transmit (downlink) ports of the hub 116. As shown in FIG. 2, these downlink ports are labeled $D_A$, $D_B$, $D_C$ and $D_D$. As is also shown in FIG. 2, a solid line shows that the base station 102 is connected to the port $D_A$. Dotted lines show optional connections to ports $D_B$, $D_C$ and $D_D$. For example, if MIMO 2×2 is employed, the base station 102 will have two connections to the downlink ports and two connections to uplink ports. In the case of MIMO 4×4, four connections for each of the uplink and downlink may be employed. While a maximum of four connections to four downlink ports are shown in FIG. 2, it will be apparent that this is exemplary and that a different number of ports may be provided.

The transmit (downlink) signals received from the base station 102 have the same or at least overlapping frequencies; for example, they may operate on the same frequency channel. However, they may contain different communication content. For example, a first downlink signal may be transmitted at port $D_A$ and may be operating in the 1900 MHz frequency band. This first downlink signal may contain communication content directed toward a particular mobile unit 120. A second downlink signal may be transmitted at port $D_B$ and may also be operating in the 1900 MHz frequency band. However, this second downlink signal may contain different communication content from that of the first downlink signal. This content of the second downlink signal may be directed a different one of the mobile units. Either of these mobile units may receive the signal intended for the other. In this case, the mobile unit may disregard the content intended for the other.

The downlink signal from ports $D_1$ through $D_4$ are routed by the hub 116 to selected groups of the antenna units 118. As shown in FIG. 2, the hub 116 is provided with transmit (downlink) ports $D_1$ through $D_8$, one for each of the eight antenna units 118. A reconfigurable switch 124 routes the downlink signals from the base station ports $D_A$ through $D_D$ to selected ones of the downlink antenna ports $D_1$ through $D_8$. For example, if there are eight antenna units 118 and MIMO 2×2 configuration is employed, half of the remote antenna units 118 may be connected to downlink port $D_A$ and the other half to downlink port $D_B$. In one such configuration, downlink port $D_A$ may be connected to antenna ports $D_1$, $D_2$, $D_3$ and $D_4$, while downlink port $D_B$ may be connected to antenna ports $D_5$, $D_6$, $D_7$ and $D_8$. Therefore, in this configuration, the downlink signal at base station port $D_A$ is repeated at antenna ports $D_1$, $D_2$, $D_3$ and $D_4$. Similarly, the signal at base station port $D_B$ is repeated at antenna ports $D_5$, $D_6$, $D_7$ and $D_8$. In an alternative configuration, downlink port $D_A$ may be connected to antenna ports $D_1$, $D_3$, $D_5$ and $D_7$, while downlink port $D_B$ may be connected to antenna ports $D_2$, $D_4$, $D_6$ and $D_8$.

The base station 102 is also connected to one or more receive (uplink) ports of the hub 116. As shown in FIG. 2, these uplink ports are labeled $U_A$, $U_B$, $U_C$ and $U_D$. As is also shown in FIG. 2, a solid line shows that the base station 102 is connected to the port $U_A$. Dotted lines show optional connections to ports $U_B$, $U_C$ and $U_D$. For example, if MIMO 2×2 is used, the base station 102 will have two connections to the uplink ports. In the case of MIMO 4×4, four connections may be employed. While a maximum of four connections to four uplink ports are shown in FIG. 2, it will be apparent that this is exemplary and that a different number of ports may be provided.

The uplink signals from selected groups of the antennas are routed by the hub 116 to the base station uplink ports $U_A$, $U_B$, $U_C$ or $U_D$. As shown in FIG. 2, the hub 116 is provided with receive (uplink) ports $U_1$ through $U_8$, one for each of the eight antenna units 118. The reconfigurable switch 124 routes the uplink signals from the antenna base station ports $U_A$ through $U_D$ to selected ones of the uplink antenna ports $U_1$ through $U_8$. For example, if there are eight antenna units 118 and a MIMO 2×2 configuration is used, half of the remote antenna units 118 may be connected to uplink port $U_A$ and the other half to uplink port $U_B$. In one such configuration, uplink port $U_A$ may be connected to antenna ports $U_1$, $U_2$, $U_3$ and $U_4$, while uplink port $U_B$ may be connected to antenna ports $U_5$, $U_6$, $U_7$ and $U_8$. Therefore, in this configuration, uplink signals at antenna ports $U_1$, $U_2$, $U_3$ and $U_4$ may be combined by signal summation to form the uplink signal at base station port $U_A$. Similarly, the signal at antenna ports $U_5$, $U_6$, $U_7$ and $U_8$ are combined to form the uplink signal at base station port $U_B$. In an alternative configuration, uplink port $U_A$ may be connected to antenna ports $U_1$, $U_3$, $U_5$ and $U_7$, while uplink port $U_B$ may be connected to antenna ports $U_2$, $U_4$, $U_6$ and $U_8$.

The receive (uplink) signals received from the hub 102 at the uplink ports $U_A$ through $U_D$ have the same receive frequency and contain redundant content and/or overlapping channels. However, the uplink signals may not contain identical content since the signal transmitted by a particular mobile device may be present within a channel of one of the uplink signals, but may not be present in all of the uplink signals or it may be present with different signal strength.

The system 100 is capable of supporting duplex communications between the base station 102 and the mobile units 120. In a preferred embodiment, each antenna unit 118 uses single antenna for the duplexed uplink and downlink signals. For example, the uplink and downlink signals may operate in accordance with frequency division duplexing. Alternatively, the uplink and downlink signals may operate in accordance with time division duplexing. Referring to the drawings, the downlink signal at antenna port $D_1$ and the uplink signal at antenna port $U_1$ may be duplexed. The downlink and uplink signals at the other ports may be similarly duplexed.

The downlink signals generated by the base station 102 may be radio frequency (RF) signals. Similarly, the downlink signals transmitted by the antenna units 118 may be RF. Accordingly, the downlink signals may be routed by the hub 116 in RF without frequency conversion. Alternatively, RF downlink signals generated by the base station 102 may be down-converted to intermediate frequency (IF) signals for routing by the hub 116. The IF signals may then be up-converted to RF prior to retransmission by the antenna units 118. For example, for the downlink, the hub 116 may include frequency down-converters in the path between the ports $D_A$, $D_B$, $D_C$ and $D_D$ and the switch 124. Also for the downlink, frequency up-converters may be located in the hub 116 between the switch 124 and the ports $D_1$ though $D_8$. Alternatively, the frequency up-converters may be located in the antenna units 118. For the uplink, frequency down-converters may be located in the hub 116 between the ports $U_1$ through $U_8$ the switch 124 or in the antenna units 118. Also for the uplink, frequency up-converters may be located in the hub 116 between the switch 124 and the ports $U_A$, $U_B$, $U_C$ and $U_D$.

The DAS system may be connected to various different base stations that support various different MIMO configurations. The reconfigurable switch 124 of the hub 116 accommodates these different base station configurations. In addition, the hub 116 may also allow a user to select (through a user interface) among permissible predetermined configurations of the switch 124. Using the examples above, for MIMO 2×2, the reconfigurable switch 124 may connect half of the remote antenna units 118 to downlink port $D_A$ and the other half to downlink port $D_B$. However, there may be multiple permissible alternatives for making such a connection. In a first configuration, downlink port $D_A$ may be connected to antenna ports $D_1$, $D_2$, $D_3$ and $D_4$, while downlink port $D_B$ may be connected to antenna ports $D_5$, $D_6$, $D_7$ and $D_8$. In a second configuration, downlink port $D_A$ may be connected to antenna ports $D_1$, $D_3$, $D_5$ and $D_7$, while downlink port $D_B$ may be connected to antenna ports $D_2$, $D_4$, $D_6$ and $D_8$. For such a MIMO 2×2 configuration, the ports $D_C$, $D_D$, $U_C$ and $U_D$ are unused and, thus, may have no connection.

In a preferred embodiment, the hub 116 automatically determines which of the base station downlink ports $D_A$ through $D_B$ are active and which of the base station uplink ports $U_A$ through $U_B$ are active. The hub 116 may also determine which of the antenna downlink ports D1 though D8 and uplink ports U1 though U8 have a connected antenna unit 118. This may be accomplished a hub controller 126 sensing whether electrical signals are present at the ports (e.g. by field strength sensing) or sensing whether a cable is mechanically plugged into the ports (e.g. by a mechanical switch). This determination of which ports are active is then determinative of the permissible predetermined configurations of the switch 124. In this case, the switch 124 can be configured and reconfigured by the hub controller 126 (i.e. the switch 124 is reconfigurable under remote control).

Where a maximum of four downlink and four uplink base station ports are provided, typical configurations of the base station 102 include: single-input, single-output (which may also be referred to as "SISO" or "MIMO 1×1"); single-input, dual-output (which may also be referred to as "SIMO 1×2" or "MIMO 1×2"); single-input, quad-output (which may also be referred to as "SIMO 1×4" or "MIMO 1×4"); dual-input, single-output (which may also be referred to as "MISO 2×1" or "MIMO 2×1"); dual-input, dual-output (which may also be referred to as "MIMO 2×2"); dual-input, quad-output (which may also be referred to as "MIMO 2×4"); quad-input, single-output (which may also be referred to as "MISO 4×1" or "MIMO 4×1"); quad-input, dual-output (which may also be referred to as "MIMO 4×2"); and quad-input, quad-output (which may also be referred to as "MIMO 4×4").

For MIMO 1×1, one downlink base station port (e.g. port $D_A$) and one uplink base station port (e.g. port $U_A$) are active. In this case, there may be a single permissible configuration of the switch 124 in which the base station port $D_A$ is connected to all of the downlink antenna ports (e.g. ports $D_1$ though $D_8$) and in which all of the uplink antenna ports (e.g. ports $U_1$ through $U_2$) are connected to the base station port $U_A$.

For MIMO 1×2, one downlink base station port (e.g. port $D_A$) and two uplink base station ports (e.g. ports $U_A$ and $U_B$) are active. In this case, there may be multiple permissible configurations of the switch 124. In the permissible configurations, the base station port $D_A$ may be connected to all of the downlink antenna ports (e.g. ports $D_1$ though $D_8$) while the uplink antenna ports (e.g. ports $U_1$ through $U_8$) may be divided into two groups with one group being connected to the base station port $U_A$ and the other group connected to the base station port $U_B$.

Figure 3A:
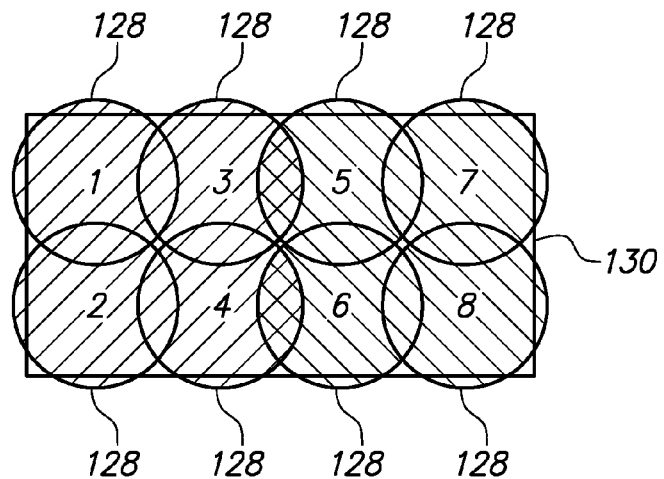
FIGS. 3A-C illustrate exemplary arrangements of coverage areas for distributed antenna units in accordance with embodiments of the present invention.
Figure 3B:
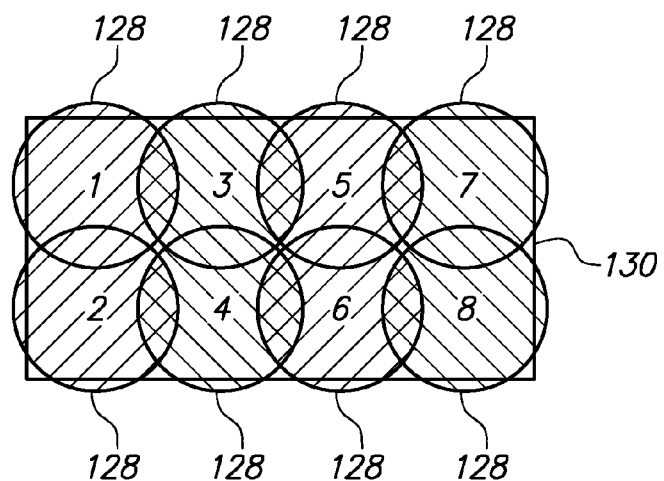
Figure 3C:
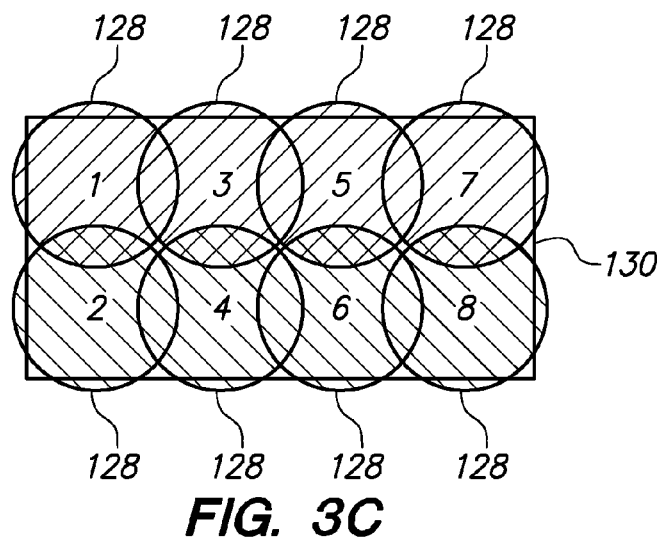

FIGS. 3A-C illustrate exemplary arrangements of coverage areas 128 for the distributed antenna units 118. In a preferred embodiment, the coverage areas 128 are located indoors, within a building 130. For example, the arrangements may be for a single story building or a single level in a multi-story building. Each coverage area 128 corresponds to an antenna unit 118 and, thus, each coverage area 128 also corresponds to an antenna port of the hub 116. The coverage areas shown in FIG. 3A-C are preferably distributed uniformly within the building 130 and are equally applicable to downlink and uplink signaling. Because there are eight downlink and uplink antenna ports, there are eight coverage areas 128 shown in FIGS. 3A-C. The coverage areas 128 are drawn roughly circular and labeled with the number of the corresponding antenna port. FIG. 3A shows that the coverage areas for antenna ports 1-4 form a first group and that coverage areas for antenna ports 5-8 form a second group.

Thus, returning to the MIMO 1×2 example, FIG. 3A shows that the uplink antenna ports $U_1$ through $U_4$ are in the first group and are connected to the base station port $U_A$ and that the uplink antenna ports $U_5$ through $U_8$ are in the second group and are connected to the base station port $U_B$. In FIG. 3A, the groups of remote antenna units are arranged to maximize the contiguous areas of coverage and to minimize boundaries between the coverage areas of different groups of antenna units 118. It can be seen that the contiguous areas of coverage are maximized because the areas of the antennas for ports 1, 2, 3 and 4 form one contiguous area, while the areas of the antennas for ports 5, 6, 7 and 8 form another contiguous area. It can also be seen that the boundaries are minimized in FIG. 3A since there are only two areas of overlap between coverage areas of the different groups: between the areas of the antennas for ports 3 and 5 and between the areas of the antennas for ports 4 and 6. Such a configuration is beneficial to reduce interference among different mobile units 140 that are communicating with the base station 102 via different antenna units 118.

FIG. 3B shows that the uplink antenna ports $U_1$, $U_2$, $U_5$, and $U_6$ are in the first group and are connected to the base station port $U_A$ and that the uplink antenna ports $U_3$, $U_4$, $U_7$, and $U_8$ are in the second group and are connected to the base station port $U_B$. In this configuration, the antenna unit 118 are adjacent to antenna units 118 in a different group. In FIG. 3B, the groups of remote antenna units are arranged to minimize the contiguous areas of coverage and to maximize the boundaries between the coverage areas of different groups of antenna units 118. It can be seen that the contiguous areas of coverage are minimized, in comparison to the arrangement of FIG. 3A because each contiguous area only include the areas of two antennas. It can also be seen that the boundaries are maximized in comparison to that of FIG. 3A since in FIG. 3B there are six areas of overlap between coverage areas of the different groups: between the areas of the antennas for ports 1 and 3; between the areas of the antennas for ports 2 and 4; between the areas of the antennas for ports 3 and 5; between the areas of the antennas for ports 4 and 6; between the areas of the antennas for ports 5 and 7; and between the areas of the antennas for ports 6 and 8. Such a configuration tends to maximize interference among adjacent coverage areas and is, thus, beneficial for interference cancellation.

Still another arrangement that would further minimize the contiguous areas of coverage and to maximize the boundaries between the coverage areas of different antenna units 118 would be to arrange the areas of coverage 128 in an alternating, checkerboard pattern (e.g. with uplink antenna ports $U_1$, $U_4$, $U_5$ and $U_8$ being in the first group and with uplink antenna ports $U_2$, $U_3$, $U_6$ and $U_7$ being in the second group).

FIG. 3C shows an embodiment in which the uplink antenna ports $U_1$, $U_3$, $U_5$, and $U_7$ are in the first group and are connected to the base station port $U_A$. In addition, the uplink antenna ports $U_2$, $U_4$, $U_6$, and $U_8$ are in the second group and are connected to the base station port $U_B$. This configuration is essentially a compromise between the configurations of FIGS. 3A and 3B.

In an embodiment, the user may select from among the permissible configurations of the switch 124 and, thus, the grouping arrangements of the antenna coverage areas 128. For example, the user may try each grouping arrangement for a period of time and then may be select the one which yields the greatest overall performance for continuous operation. It will be apparent that the predetermined groups of FIGS. 3A-C are exemplary and that different groups may be formed.

For MIMO 1×4, one downlink base station port (e.g. port $D_A$) and four uplink base station ports (e.g. ports $U_A$ through $U_D$) are active. In this case, there may be multiple permissible configurations of the switch 124. In the permissible configurations, the base station port $D_A$ may be connected to all of the downlink antenna ports (e.g. ports $D_1$ though $D_8$) while the uplink antenna ports (e.g. ports $U_1$ through $U_8$) may be divided into four groups with one group being connected to each of the base station ports $U_A$ through $U_D$. As before, the permissible groupings may either minimize interference by minimizing boundaries or may maximize interference by maximizing boundaries or may represent a compromise between the two extremes. The user may select from among a plurality of permissible grouping arrangements.

For MIMO 2×1, two downlink base station ports (e.g. ports $D_A$ and $D_B$) and one uplink base station port (e.g. port $U_A$) are active. In this case, there may be multiple permissible configurations of the switch 124. In the permissible configurations, the base station port $U_A$ may be connected to all of the uplink antenna ports (e.g. ports $U_1$ though $U_8$) while the downlink antenna ports (e.g. ports $D_1$ through $D_8$) may be divided into two groups with one group being connected to the base station port $D_A$ and the other group being connected to the base station port $D_B$. In this case, the user may select from among the permissible groups (which may include the groups of FIGS. 3A-C) for the downlink signals.

For MIMO 2×2, two downlink base station ports (e.g. ports $D_A$ and $D_B$) and two uplink base station ports (e.g. ports $U_A$ and $U_B$) are active. In this case, there may be multiple permissible configurations of the switch 124. In the permissible configurations, the downlink antenna ports (e.g. ports $D_1$ through $D_8$) may be divided into two groups with one group being connected to the base station port $D_A$ and the other group being connected to the base station port $D_B$. In addition, the uplink antenna ports (e.g. ports $U_1$ through $U_8$) may be divided into two groups with one group being connected to the base station port $U_A$ and the other group connected to the base station port $U_B$. In this case, the user may select from among the permissible groups (which may include the groups of FIGS. 3A-C) for the uplink and for the downlink signals.

For MIMO 2×4, two downlink base station ports (e.g. ports $D_A$ and $D_B$) and four uplink base station ports (e.g. ports $U_A$ though $U_D$) are active. In this case, there may be multiple permissible configurations of the switch 124. In the permissible configurations, the downlink antenna ports (e.g. ports $D_1$ through $D_8$) may be divided into two groups with one group being connected to the base station port $D_A$ and the other group being connected to the base station port $D_B$. In addition, the uplink antenna ports (e.g. ports $U_1$ through $U_8$)

may be divided into four groups with one group being connected to each of the base station ports $U_A$ through $U_D$. In this case, the user may select from among a plurality of permissible groups for the uplink and for the downlink signals.

For MIMO 4×1, four downlink base station ports (e.g. ports $D_A$ through $D_D$) and one uplink base station port (e.g. port $U_A$) are active. In this case, there may be multiple permissible configurations of the switch 124. In the permissible configurations, the downlink antenna ports (e.g. ports $D_1$ through $D_8$) may be divided into four groups with one group being connected to each of the base station ports $D_A$ through $D_D$ while the base station port $U_A$ may be connected to all of the uplink antenna ports (e.g. ports $U_1$ though $U_8$). As with other MIMO configurations, the permissible groupings may either minimize interference by minimizing boundaries or may maximize interference by maximizing boundaries or may represent a compromise between the two extremes. The user may select from among a plurality of permissible grouping arrangements for the downlink signals.

For MIMO 4×2, four downlink base station ports (e.g. ports $D_A$ through $D_B$) and two uplink base station ports (e.g. ports $U_A$ and $U_D$) are active. In this case, there may be multiple permissible configurations of the switch 124. In the permissible configurations, the downlink antenna ports (e.g. ports $D_1$ through $D_8$) may be divided into four groups with one group being connected to each of the base station ports $D_A$ through $D_D$. In addition, the uplink antenna ports (e.g. ports $U_1$ through $U_8$) may be divided into two groups with one group being connected to the base station port $U_A$ and the other group being connected to the base station port $U_B$. In this case, the user may select from among a plurality of permissible groups for the uplink and for the downlink signals.

For MIMO 4×4, four downlink base station ports (e.g. ports $D_A$ through $D_B$) and four uplink base station ports (e.g. ports $U_A$ though $U_D$) are active. In this case, there may be multiple permissible configurations of the switch 124. In the permissible configurations, the downlink antenna ports (e.g. ports $D_1$ through $D_8$) may be divided into four groups with one group being connected to each of the base station ports $D_A$ through $D_D$. In addition, the uplink antenna ports (e.g. ports $U_1$ through $U_8$) may be divided into four groups with one group being connected to each of the base station ports $U_A$ through $U_D$. In this case, the user may select from among a plurality of permissible groups for the uplink and for the downlink signals.

Figure 4:
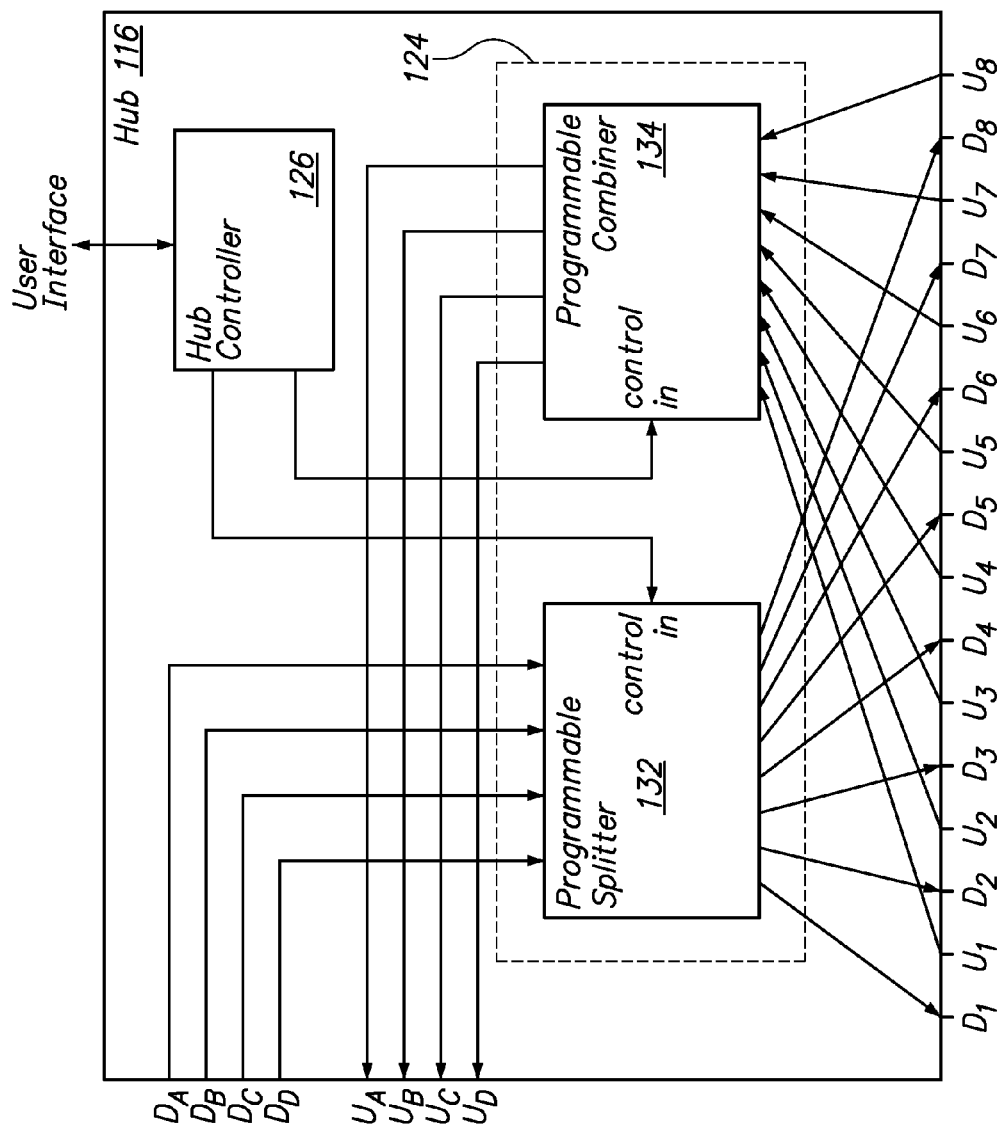
FIG. 4 illustrates a hub comprising a programmable splitter and a programmable combiner in accordance with an embodiment of the present invention.

The reconfigurable switch 124 may be implemented by, for example, signal routing elements chosen from among a crossbar switch, an appropriate configuration of multiplexers, or an appropriate arrangement of signal splitters and combiners. In each case, the switch 124 may be remotely reconfigured under control of the hub controller 126. FIG. 4 shows an exemplary embodiment of the hub 116 in which a programmable splitter 132 may be provided for the downlink with each downlink base station port $D_A$ though $D_D$ being connected to an input of the splitter 132 and with the outputs of the splitter 132 being connected to the downlink antenna ports $D_1$ through $D_8$. The splitter 132 can be remotely controlled to cause the downlink signals to be routed from any of the base station ports $D_A$ though $D_D$ to any of the antenna ports $D_1$ through $D_8$. For the uplink, a programmable combiner 134 may be provided for the uplink with the inputs of the combiner 134 being connected to the uplink antenna ports $U_1$ through $U_8$ and with the outputs of the combiner 134 being connected to the uplink base station ports $U_A$ though $U_D$. The combiner 134 can be remotely controlled to cause the uplink signals to be routed from any antenna port to any base station port. Operation of the hub 116, including the configuration of the reconfigurable switch 124, may controlled by a hub controller 126. The signal routing elements may be passive (without amplification) or active (with amplification).

Figure 5:
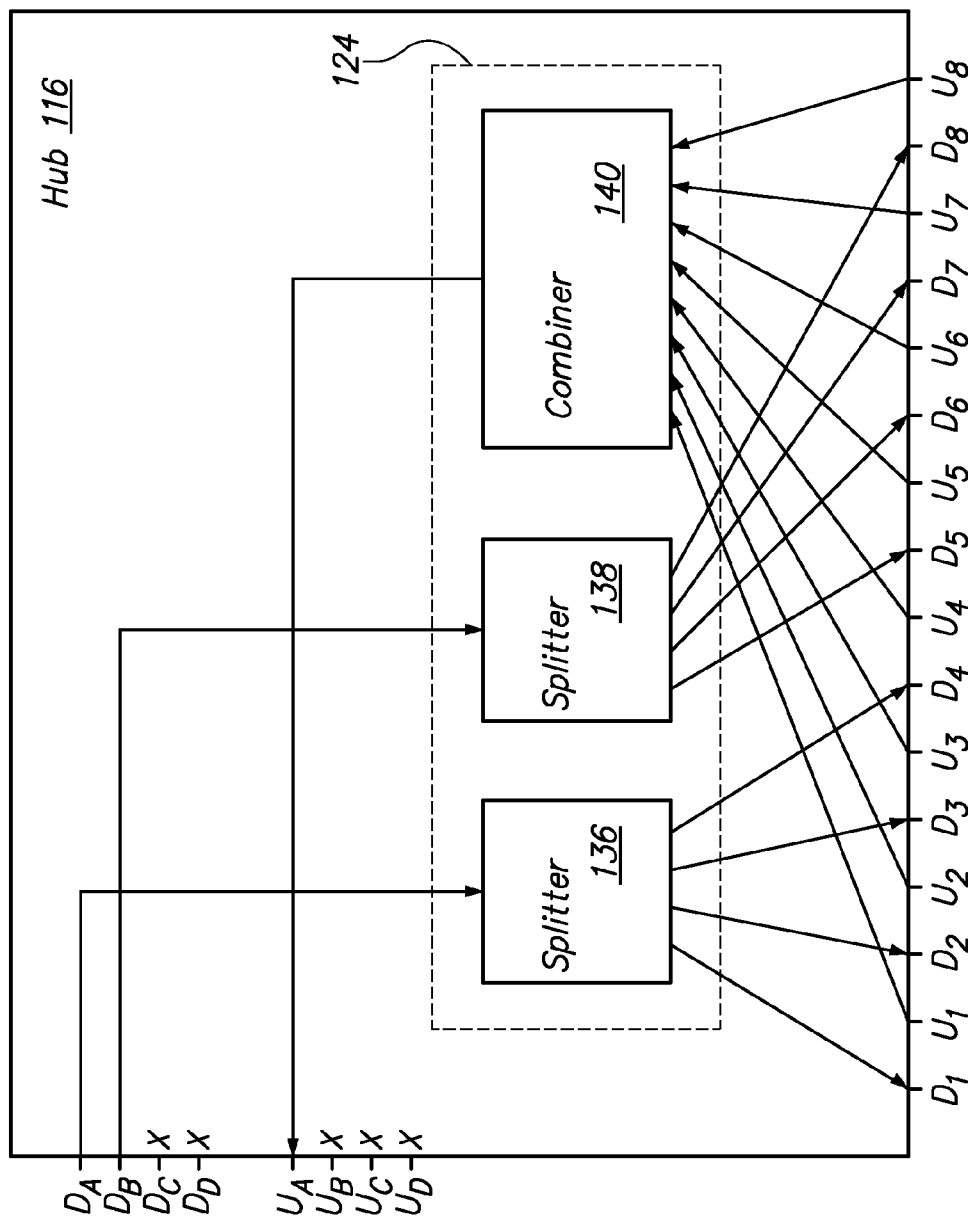
FIG. 5 illustrates a hub comprising hard-wired splitters and a hard-wired combiner in accordance with an embodiment of the present invention.

In an alternative embodiment, rather than being remote controlled, the switch 124 is manually configured (i.e. "hard-wired"). FIG. 5 illustrates the hub 116 in which the downlink and uplink signals are routed by splitters 136, 138 and a combiner 140. More particularly, the splitter 136 is a one-to-four splitter having its input connected to the base station downlink port $D_A$. The four outputs of the splitter 136 are connected to the antenna downlink ports $D_1$, $D_2$, $D_3$, and $D_4$, respectively. The splitter 138 is a one-to-four splitter having its input connected to the base station downlink port $D_B$. The four outputs of the splitter 138 are connected to the antenna downlink ports $D_5$, $D_6$, $D_7$, and $D_8$, respectively. The combiner 140 is an eight-to-one combiner having its output connected to the base station uplink port $U_A$. The eight inputs of the combiner 140 are connected to the antenna uplink ports $U_1$ through $U_8$, respectively. The configuration of FIG. 5 is MIMO 2×1 with the transmit coverage areas arranged as in FIG. 3A. It will be apparent that the particular configuration of FIG. 5 is exemplary and that the hub 116 may be manually configured in a variety of signal routing configurations. For example, the hub 116 may comprise cables, one or more splitters and one or more combiners located in a wiring closet; these elements of the hub 116 may be manually configured and reconfigured as desired.

Figure 6:
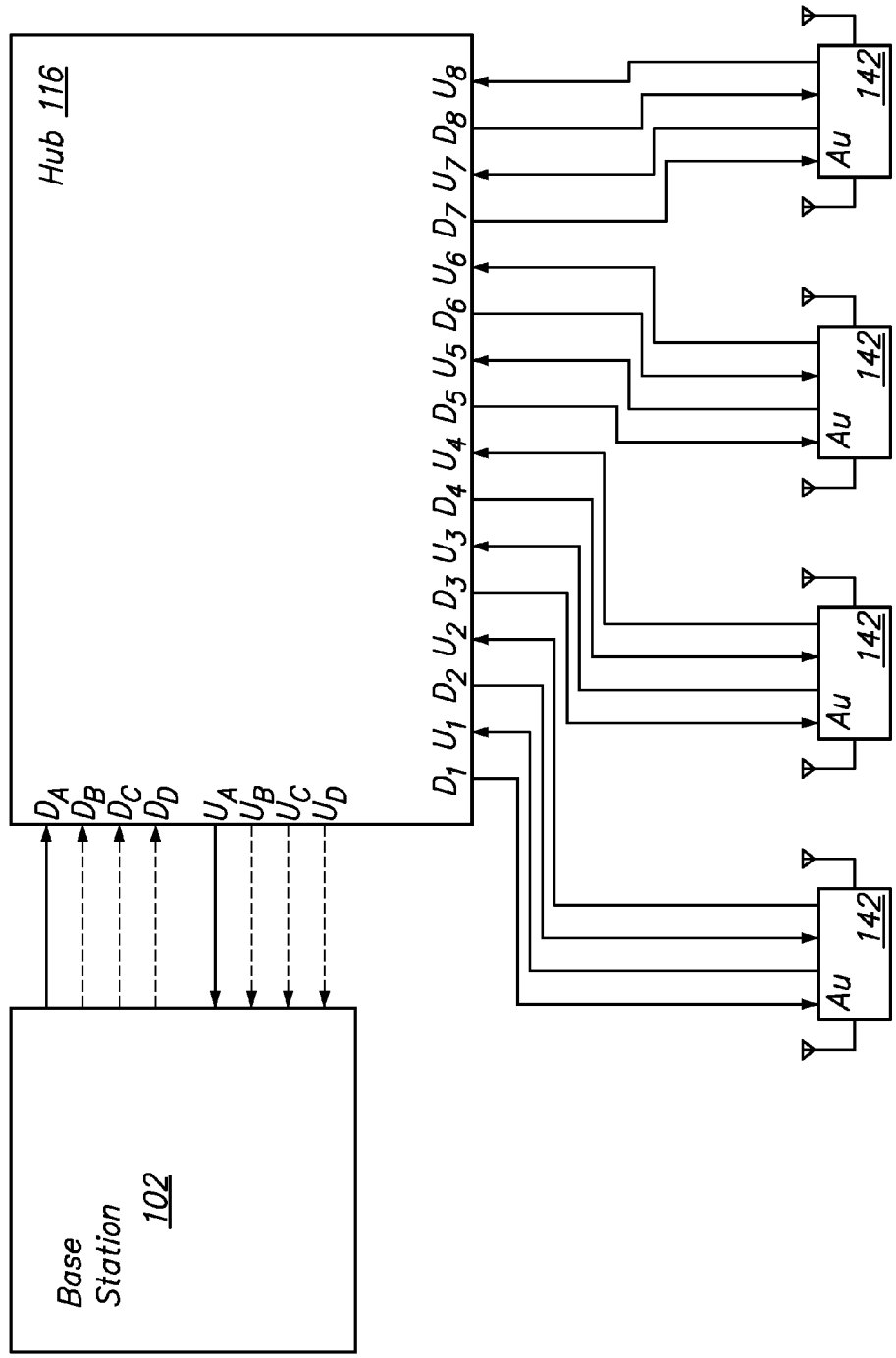
FIG. 6 illustrates a distributed antenna communications system in accordance with an alternative embodiment of the present invention.

In the embodiments described above, each antenna unit 118 comprises one transmitting and one receiving antenna (though these duplex functions may be performed by a single antenna). In an alternative embodiment, an antenna unit may be provided with two or more transmitting and/or receiving antennas. FIG. 6 illustrates a distributed antenna communications system in accordance with an alternative embodiment of the present invention. The system of FIG. 6 differs from that of FIG. 2 in that each of a plurality of antenna units 142 comprise two transmitting and two receiving antennas. As before, each antenna may perform duplex transmitting and receiving functions. However, in the system of FIG. 6, the antennas of a particular antenna unit 142 are co-located such that their coverage areas substantially overlap. Two antennas of the same antenna unit 142 may be connected to different base station downlink and/or base station uplink ports. For example, the downlink signal from base station port $D_A$ may be routed to a first antenna of a particular antenna unit 142 while the downlink signal from base station port $D_B$ may be routed to a second antenna of that same antenna unit. Similarly, the uplink signal from a first antenna of a particular antenna unit 142 may be routed to the base station uplink port $U_A$ while the uplink signal from a second antenna of that the same antenna unit 142 may be routed to the base station uplink port $U_B$.

Figure 7A:
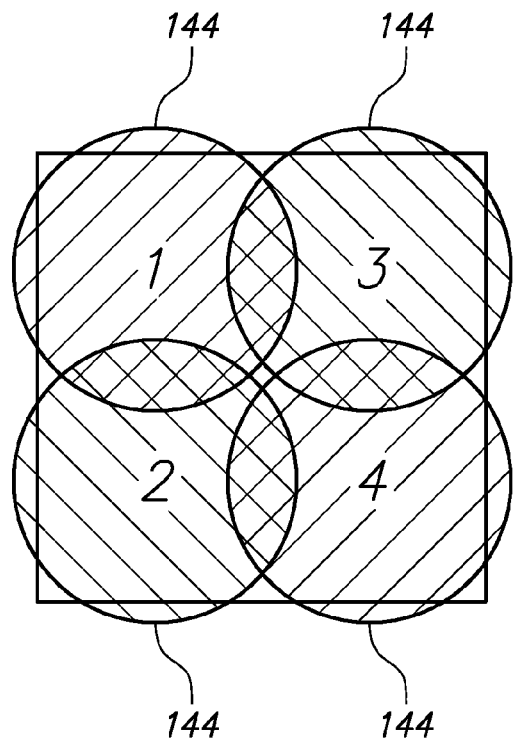
FIG. 7A-B illustrate exemplary arrangements of coverage areas for distributed antenna units in accordance with embodiments of the present invention.
Figure 7B:
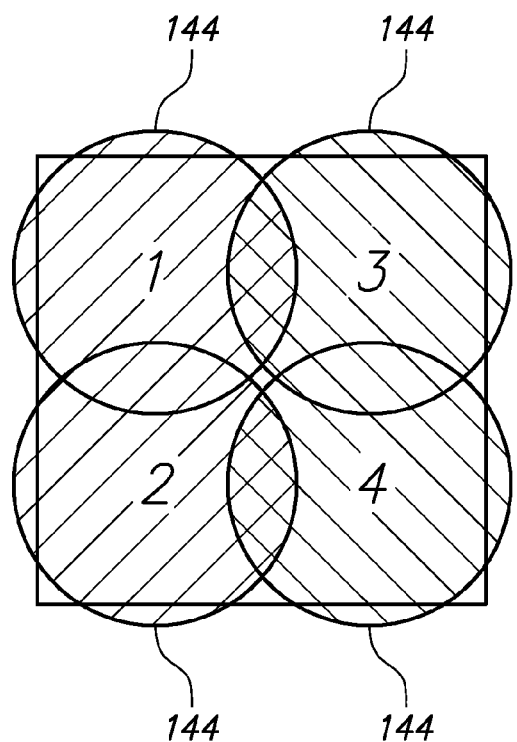

The antenna units 142 of FIG. 6 are distributed (e.g. throughout the occupied areas of a building). FIGS. 7A-B illustrate exemplary arrangements of coverage areas 144 for distributed antenna units in accordance with embodiments of the present invention. Particularly, FIGS. 7A-B show that the coverage areas 144 for downlink and uplink antenna ports $D_1$, $U_1$, $D_2$ and $U_2$ are co-located (e.g. at area "1") and that coverage areas 144 for downlink and uplink antenna ports $D_3$, $U_3$, $D_4$ and $U_4$ are co-located (e.g. at area "2"). In addition, FIGS. 7A-B show that the coverage areas 144 for downlink and uplink antenna ports $D_5$, $U_5$, $D_6$ and $U_6$ are co-located (e.g. at area "3") and that coverage areas 144 for downlink and uplink antenna ports $D_7$, $U_7$, $D_8$ and $U_8$ are co-located (e.g. at area "4").

In the embodiment of FIG. 7A, the antenna ports $U_1$ and $U_7$ (corresponding to the areas "1" and "4," respectively) may be connected to the base station uplink port $U_A$ while antenna ports $U_2$ and $U_8$ (also corresponding to the areas "1" and "4," respectively) may be connected to the base station uplink port $U_B$. Additionally in FIG. 7A, the antenna ports $U_3$ and $U_5$ (corresponding to the areas "2" and "3," respectively) may be connected to the base station uplink port $U_C$ while antenna ports $U_4$ and $U_6$ (also corresponding to the areas "2" and "3," respectively) may be connected to the base station uplink port $U_D$. The downlink antenna ports may be connected to the base station downlink ports in a like manner. In FIG. 7A, the coverage areas are arranged to minimize the contiguous areas of coverage and to maximize boundaries between the coverage areas of different antenna units 142.

In the embodiment of FIG. 7B, the antenna ports $U_1$ and $U_3$ (corresponding to the areas "1" and "2," respectively) may be connected to the base station uplink port $U_A$ while antenna ports $U_2$ and $U_4$ (also corresponding to the areas "1" and "2," respectively) may be connected to the base station uplink port $U_B$. Additionally in FIG. 7B, the antenna ports $U_5$ and $U_7$ (corresponding to the areas "3" and "4," respectively) may be connected to the base station uplink port $U_A$ while antenna ports $U_6$ and $U_8$ (also corresponding to the areas "3" and "4," respectively) may be connected to the base station uplink port $U_B$. The downlink antenna ports may be connected to the base station downlink ports in a like manner. In FIG. 7B, the coverage areas are arranged to maximize the contiguous areas of coverage and to minimize boundaries between the coverage areas of different antenna units 142.

Therefore, in FIGS. 7A-B, antennas are co-located in pairs, while the pairs are distributed. The pairs may be distributed to minimize boundaries between the coverage areas of different antenna units 142 in order to minimize interference. Alternatively, the pairs may be distributed at maximize boundaries between the coverage areas of different antenna units 142 in order to maximize interference cancellation.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A distributed antenna system comprising:
a plurality of distributed antenna units; and
a multi-port hub comprising:
a first interface for connection to a base transceiver station of a telecommunications system, the first interface comprising a plurality of downlink ports for receiving a plurality of downlink signals transmitted from the base transceiver station, the plurality of downlink signals having overlapping transmit frequencies and containing different communication content and a plurality of uplink ports for sending a plurality of uplink signals received from at least one of the distributed antenna units;
a second interface having a plurality of downlink ports for communicatively coupling the multi-port hub to the plurality of distributed antenna units and the second interface having a plurality of uplink ports for communicatively coupling the multi-port hub to the plurality of distributed antennas units; and
means for reconfiguring the multi-port hub among a plurality of predetermined configurations, each configuration routing one or more downlink ports of the first interface to a selected group of the downlink ports of the second interface and routing a selected group of the uplink ports of the second interface to one or more of the uplink ports of the first interface such that each of the plurality of downlink signals are transmitted by one or more of the distributed antennas and each distributed antenna only transmits one of the downlink signals.

2. The distributed antenna system of claim 1, wherein the means for reconfiguring comprises a cross bar switch.

3. The distributed antenna system of claim 1, wherein the means for reconfiguring comprises combiners and splitters.

4. The distributed antenna system of claim 1, wherein the means for reconfiguring automatically senses connections to the base transceiver station.

5. The distributed antenna system of claim 1, wherein there is a greater number of downlink ports of the second interface than downlink ports of the first interface.

6. The distributed antenna system of claim 1, wherein there is a greater number of uplink ports of the second interface than uplink ports of the first interface.

7. The distributed antenna system of claim 1, wherein the distributed antenna system is configured to distribute Multiple-Input, Multiple-Output (MIMO) signals.

8. The distributed antenna system of claim 1, wherein the distributed antenna units are located indoors.

9. A method of distributing communications comprising:
receiving from a base transceiver station of a telecommunications system at a plurality of downlink ports included in a first interface of a multi-port hub included in a distributed antenna system a plurality of downlink signals transmitted from the base transceiver station, the plurality of downlink signals having overlapping transmit frequencies and containing different communication content;
sending a plurality of uplink signals from a plurality of uplink ports included in the first interface of the multi-port hub to the base transceiver station;
sending at least some of the downlink signals from a plurality of downlink ports included in a second interface of the multi-port hub to a plurality of distributed antenna units that are communicatively coupled to the multi-port hub;
receiving at least some of the uplink signals at a plurality of uplink ports included in the second interface from the plurality of distributed antenna units; and
reconfiguring the multi-port hub among a plurality of predetermined configurations, each configuration routing one or more downlink ports of the first interface to a selected group of the downlink ports of the second interface and routing a selected group of the uplink ports of the second interface to one or more of the uplink ports of the first interface such that each of the plurality of downlink signals are transmitted by one or more of the distributed antennas and each distributed antenna only transmits one of the downlink signals.

10. The method of claim 9, wherein reconfiguring the multi-port hub comprises using a cross bar switch to reconfigure the multi-port hub.

11. The method of claim 9, wherein reconfiguring the multi-port hub comprises using combiners and splitters.

12. The method of claim 9, wherein reconfiguring the multi-port hub comprises automatically sensing connections to the base transceiver station.

13. The method of claim 9, wherein the plurality of downlink signals transmitted from the base transceiver station comprises Multiple-Input, Multiple-Output (MIMO) downlink signals; and wherein the uplink signals comprises Multiple-Input, Multiple-Output (MIMO) uplink signals.

14. The method of claim 9, wherein the distributed antennas units are located indoors.

15. A multi-port hub for use in a distributed antenna system, the multi-port comprising:
   a first interface for connection to a base transceiver station of a telecommunications system, the first interface comprising a plurality of downlink ports for receiving a plurality of downlink signals transmitted from the base transceiver station, the plurality of downlink signals having overlapping transmit frequencies and containing different communication content and a plurality of uplink ports for sending a plurality of uplink signals received from at least one of the distributed antenna units to the base transceiver station; and
   a second interface having a plurality of downlink ports for communicatively coupling the multi-port hub to a plurality of distributed antenna units and the second interface having a plurality of uplink ports for communicatively coupling the multi-port hub the plurality of distributed antennas units; and
   wherein the multi-port hub is configured to reconfigure the multi-port hub among a plurality of predetermined configurations, each configuration routing one or more downlink ports of the first interface to a selected group of the downlink ports of the second interface and routing a selected group of the uplink ports of the second interface to one or more of the uplink ports of the first interface such that each of the plurality of downlink signals are transmitted by one or more of the distributed antennas and each distributed antenna only transmits one of the downlink signals.

16. The multi-port hub of claim 15, further comprising a cross bar switch to reconfigure the multi-port hub among the plurality of predetermined configurations.

17. The multi-port hub of claim 15, further comprising combiners and splitters reconfigure the multi-port hub among the plurality of predetermined configurations.

18. The multi-port hub of claim 15, wherein the multi-port hub is configured to automatically sense connections to the base transceiver station.

19. The multi-port hub of claim 15, wherein the multi-port hub is configured to distribute Multiple-Input, Multiple-Output (MIMO) signals.

20. The multi-port hub of claim 15, wherein the multi-port hub is configured to communicate with distributed antenna units that are located indoors.

* * * * *